Jan. 27, 1953 R. C. FERGASON 2,626,809
MANURE SPREADER FEEDING DEVICE
Filed April 20, 1950
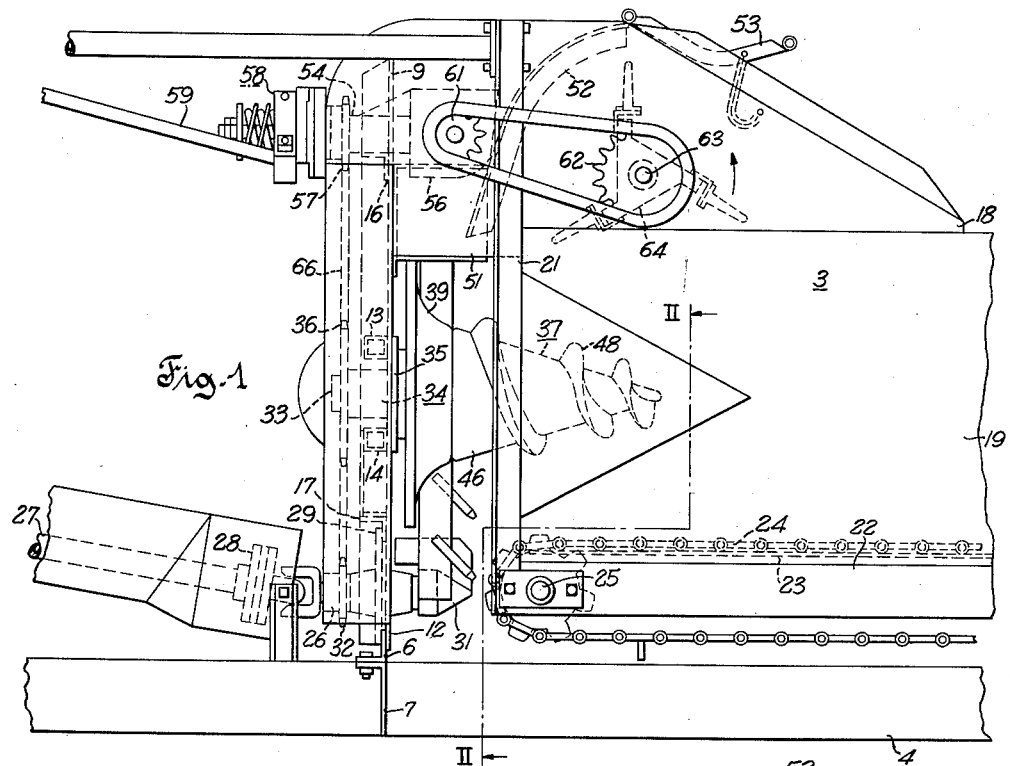
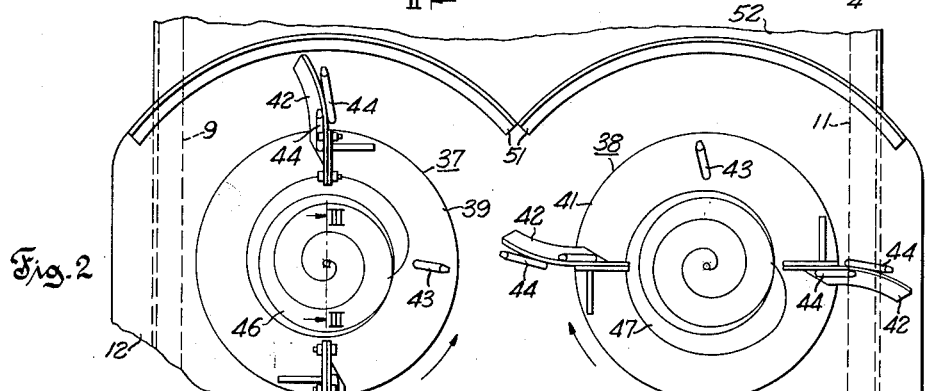
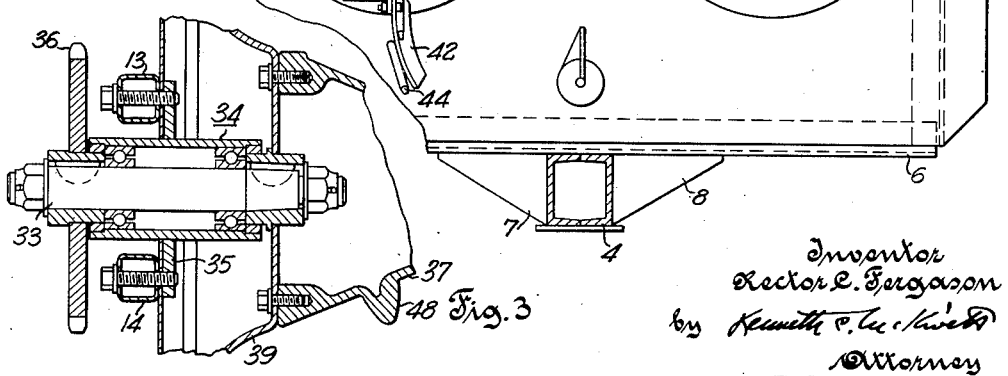
Inventor
Rector C. Fergason
by Kenneth P. McKirdy
Attorney Patented Jan. 27, 1953

2,626,809

UNITED STATES PATENT OFFICE 2,626,809

MANURE SPREADER FEEDING DEVICE

Rector C. Fergason, Gadsden, Ala., assignor to Allis-Chalmers Manufacturing Company, Milwaukee, Wis.

Application April 20, 1950, Serial No. 157,155

6 Claims. (Cl. 275—8)

This invention relates to a fertilizer or manure distributor and is applicable to all types of such distributors although shown and described as applied to a front spreader type, but not claimed, in a copending application of Charles J. Scranton, Serial No. 147,391, filed March 3, 1950. More particularly, the present invention is concerned with and directed toward the provision of a distributor incorporating features designed to improve the structural and functional coaction of parts in a manner affording material advantages as to conveying and/or spreading operations.

It is, therefore, a principal object of this invention to provide a manure spreader with improved means for uniformly conveying manure from the body thereof to the slingers.

Another object of this invention is to provide an improved unitary fertilizer slinger and slinger feeding device.

Another object of this invention is to provide a slinger feeder device with features of improvement operatively bridging the space between the discharge end of the floor conveyor and the slinger members.

Still another object of this invention is to provide means for feeding material from a conveyor to a slinging device which substantially eliminates compacting the material during such feeding.

The construction and operation of apparatus embodying the invention will become readily apparent as the disclosure progresses and particularly points out additional features and advantages considered of special importance. And accordingly, the invention may be considered as consisting of various details of construction, correlation of elements and arrangement of parts as is more fully set forth in the following description reference being had to the accompanying drawings, in which:

Fig. 1 is a side elevation of a portion of the fertilizer distributor embodying the invention;

Fig. 2 is a view taken on line II—II of Fig. 1; and

Fig. 3 is a section view on line III—III of Fig. 2 with some parts omitted.

Referring to the drawing, it is seen that the invention may be embodied in a power take-off operated front spreading fertilizer distributor 3 having a supporting frame 4 which is adapted to be mounted on a two wheeled axle structure (not shown) and having the forward end of the supporting frame attached to a tractor (not shown). A transversely extending angle member 6 is attached to gusset plates 7 and 8 which are joined to a mid-portion of supporting frame 4 as by welding. Vertically extending angle members 9 and 11 are attached to opposite ends of angle member 6 and these vertical members are additionally braced and spaced apart by vertical plate 12 by transversely extending tube members 13 and 14, and by transversely extending angle irons 16 and 17. Longitudinally extending transversely spaced plates 18 are attached at their forward ends to angle members 9 and 11, respectively (only the plate attached to angle member 9 being shown). Longitudinally extending transversely spaced side members 19 (only one of which is shown) are attached at their forward upper ends to plates 18 and are further joined thereto by means of vertically extending angle irons 21 which are attached to the side members and plates by conventional means. Extending along the lower portions of side members 19 are longitudinally extending frame members 22 (only one of which is shown) which carry material supporting floor section 23 about which an endless material conveyor 24 is operatively mounted. The forward ends of frame members 22 rotatably receive end portions of a transversely extending shaft 25 which drivingly supports the forward end of conveyor 24. The rear end of the conveyor is supported in a similar manner (not shown). Material supporting floor section 23 and longitudinally extending side members 19 form a receptacle for containing fertilizer material. The rear ends of side members 19 are joined by a transversely extending member (not shown) which forms the rear end of the receptacle.

A power input shaft 26 is universally connected to a telescoping shaft 27 which is adapted to be connected to the power take-off of a tractor (not shown). Telescoping shaft 27 has incorporated therein a conventional overload clutch 28. Power input shaft 26 is suitably journaled in a plate 29 attached to transversely extending angle irons 6 and 17. Attached to the rearward end of shaft 26 is an impeller member 31. The purpose of this impeller member is to prevent an accumulation of manure on the portion of frame 4 located immediately beneath the impeller member. A sprocket 32 is attached at the forward end of shaft 26 for rotation therewith. A pair of transversely spaced slinger shafts 33 (only one of which is shown) are journaled in bearing assemblies 34 carried by a plate 35 attached to tubes 13 and 14. Sprockets 36 (only one of which is shown) are attached to the forward ends of the slinger shafts. Attached to the rearward ends of shafts 33 are feeder slinger assemblies 37 and 38 including slinger support members 39 and 41, respectively, which are attached to shafts 33. Mounted on the periphery of each slinger support member are curved slinger blades 42 with the blades on each support member being positioned diametrically opposed and with each blade curving toward the direction of rotation. Also mounted on each slinger support member are shredder spikes 43. Similar spikes 44 are attached to each blade. Attached to the rearward end of slinger supports 39 and 41 are feeder cones 46 and 47, respectively. This attachment is accomplished by conventional means such as nuts and bolts. As can be seen from Fig. 1, the slinger supports have a curved configuration which is a continuation of the conical shape of the feeders thereby resulting in feeder slinger assemblies 37 and 38 being conical in configuration. Attached to each feeder cone as by welding is a screw like rib 48 which starts at the apex of the cone and unwinds spirally helically forwardly about the periphery of the cone. The purpose of the feeder cone and rib is to aid in conveying fertilizer material from the adjacent end of conveyor 24 to the slinger blades 42 for vertical downward distribution thereby. The conical feeders are particularly adapted for this purpose in that they supply material to the slinger blades at a position far enough removed from the blades' axis of rotation so that there is sufficient centrifugal force available to maintain readily the material tangentially flying off of the slinger blades. In addition it is to be noted that the feeder cones overhang the floor conveyer and as a result of this overhang most of the material moved forwardly by the conveyer is moved by the feeder cones directly to the slinger blades for distribution thereby rather than having a goodly portion of the material being dropped directly on the ground from the forward end of the conveyer.

It should here be noted that side walls 19 have semi-conical flared out portions adjacent the overhanging portions of the conical feeder members. These flared out portions represent a volume substantially equal to the volume displaced by the portion of the conical feeder members which overlie the conveyor. And the purpose of this flared out portion is to prevent compacting of the material by the conical feeders.

Attached to plate 12 in superposed relation to the path of the slinger blades is a slinger shield 51. Extending upwardly from the rear edge of slinger shield 51 is a guide shield 52 which is attached at the sides thereof to plates 18. At the upper edge of the guide shield, a floating shield 53 is pivotally mounted between plates 18. The slinger shield prevents an upward distribution of material and the guide and floating shields serve as means for directing material to the slinger blades.

A shaft 54 is journaled in a gear box 56 attached to transversely extending angle iron 16 and vertically extending angle member 9. A sprocket 57 is mounted on shaft 54 and by means of a combination clutch 58, sprocket 57 may be engaged with shaft 57 to drive same. Clutch 58 is of conventional design and includes an overload jaw clutch (not shown) and a manually operable pin clutch (not shown) which pin clutch may be engaged or disengaged by means of a hand lever 59. The rear end of shaft 54 is gear connected within gear box 56 for driving a sprocket 61 which is chain connected to sprocket 62 attached to a beater shaft 63 journaled in side plates 18. Beater elements 64 are attached to beater shaft 63 and function as beating and conveying members for material contacted thereby. It should be noted that the direction of rotation of the beater shaft is such that material contacted thereby is lifted over the shaft 63 and onto the rear end of the feeders adjacent the slinger blades, thus preventing an overloading of the feeders and preventing a compacting of the material.

Speed reduction means (not shown) are interposed between the beater shaft 63 and shaft 25 of the floor conveyor for driving the latter from the beater shaft. It being understood that this speed reduction means, which may be similar to that disclosed in U. S. patent to H. J. Kuhlman, 2,343,303, for Fertilizer Distributor, granted March 7, 1944, provides a variable speed reduction means operatively connecting a beater shaft with a floor conveyor shaft.

A chain 66 drivingly engages sprockets 36 and 57 with drive sprocket 32. Chain 66 is suitably positioned by means of idler sprockets (not shown) so as to drive the feeder slinger assemblies 37 and 38 in opposite directions as indicated in Fig. 2.

The operation of spreader 3 is as follows: Conveyor 24 moves material forwardly towards feeding cones 46 and 47. Before the material reaches the discharge end of conveyor 24 it is contacted by the screw thread feeder cones which uniformly draw the material forwardly into contact with the shredding fingers 43 and 44 and the slinger blades 42. The upper portion of the material moved forwardly by the conveyor is contacted by beater members 64 which shreds and lifts the material thereover and onto the feeder cones adjacent the slinger blades. The feeder slinger assemblies revolve in opposite directions so that their adjoining surfaces are moving upwardly. The blades are prevented from slinging material upwardly by the shields. The material is downwardly vertically distributed by slinger blades during the downward movement thereof. And it should now be apparent that an efficient and simple feeding device for the slinger blades has been provided.

In the embodiment here shown and described for purposes of illustration all the mechanisms including the slingers and feeders, the impeller, the floor conveyor, and the beater are power take-off operated and the distributor is of the front spreading type. It should be understood that the slinger feeder means herein disclosed is capable of being utilized in substantially any type of spreader whether power operated or not and whether front or rear spreading and, therefore, it is not desired to limit the invention to the exact construction and arrangement of parts herein disclosed as various modifications within the scope of the appended claims may occur to persons skilled in the art.

It is claimed and desired to be secured by Letters Patent:

1. In combination in a fertilizer distributor including an elongated receptacle having a material supporting floor section, including a material conveying means operatively coacting with said floor section to move material therealong toward one end of said receptacle, and including a material slinging device having a pair of support members operatively mounted adjacent said one end of said receptacle in opposed material receiving relation to the discharge end of said conveying means, the improvement comprising a pair of conical feeding members mounted adjacent said one end of said receptacle with the apices of said conical members positioned in spaced elevated overlying relation to the discharge end of said conveying means, said conical members having parallel axes of rotation extending in the general direction material is moved by said conveying means and each conical member having a raised rib portion on the periphery thereof for aiding in delivering material from said conveying means to said slinging device, said support members being attached to the bases of said conical members for rotation therewith and forming conical extensions thereof, and means operatively connecting said conveying means, said slinging device, and said feeding members with a power source.

2. In combination in a fertilizer distributor including an elongated receptacle having a material supporting floor section, including a material conveying means operatively coacting with said floor section to move material therealong toward one end of said receptacle, and including a material slinging device having a pair of support members operatively mounted adjacent said one end of said receptacle in material receiving relation to the discharge end of said conveying means, the improvement comprising a pair of conical feeding members mounted adjacent said one end of said receptacle with the apex end of each cone thereof positioned in spaced overlying relation to the discharge end of said conveying means, said conical members having parallel axes of rotation passing through the apices of said members and extending generally in the direction material is moved by said conveying means, each of said conical members having a spiral helical ribbed portion commencing at the apex thereof and extending around the periphery thereof for aiding in delivering material to said slinging device, each of said support members being attached to one of said conical feeders to form a continuation of the conical configuration thereof and for rotation therewith about a common axis, and means operatively connecting said conveying means and said slinging device with a power source.

3. In combination in a fertilizer distributor including an elongated receptacle having side walls transversely spaced apart by a material supporting floor section, including a material conveying means operatively coacting with said floor section to move material therealong toward one end of said receptacle, and including a material slinging device having a pair of support members operatively mounted adjacent said one end of said receptacle in material receiving relation to the discharge end of said conveying means, the improvement comprising a pair of conical feeding members mounted adjacent said one end of said receptacle with the apex end of each cone thereof positioned in spaced overlying relation to the discharge end of said conveying means, said conical members having parallel axes of rotation passing through the apices of said members and extending generally in the direction material is moved by said conveying means, each of said conical members having a spiral helical ribbed portion commencing at the apex thereof and extending around the periphery thereof for aiding in delivering material to said slinging device, each of said support members being attached to one of said conical feeders to form a continuation of the conical configuration thereof and for rotation therewith about a common axis, said side walls having semi-conical flared out portions positioned adjacent said conical members and providing additional capacity to said receptacle commensurate with the volume of the space occupied by the portions of said conical members which overlies said conveyer, and means operatively connecting said conveying means, and said slinging device, said last named means including means for driving said support members in opposite directions wherein adjacent surfaces of said support members move upwardly.

4. In combination in a fertilizer distributor including an elongated receptacle having a material supporting floor section including a material conveying means operatively coacting with said floor section to move material therealong toward one end of said receptacle, and including a material slinging device having a pair of support members mounted for rotation adjacent said one end of said receptacle in material receiving relation to the discharge end of said conveying means, the improvement comprising a pair of conical feeding members joined to said support members for rotation therewith and with the apex end of each conical member positioned in spaced elevated overlying relation to the discharge end of said conveying means and with the base end of each conical member being joined to said support members, said conical members having parallel axes of rotation passing through the bases and apices thereof and extending generally in the direction material is moved by said conveying means, each of said conical members having a spiral helical ribbed portion commencing at the apex thereof and extending around the periphery to the base thereof for aiding in moving material from said conveying means to said support members, each of said support members being so shaped as to form a continuation of the conical configuration of the conical member joined thereto and each of said support members having material slinging means attached thereto, and power means for rotating said support members about said axes and for operating said conveying means.

5. In a fertilizer distributor including an elongated receptacle having a material supporting floor section, a material conveying means operatively coacting with said floor section to move material therealong toward one end of said receptacle, and a material slinging device mounted for rotation on a horizontal axis at said one end of said receptacle in opposed material receiving relation to the discharge end of said conveying means, the improvement comprising an elongated feeding device extending coaxially with said slinging device in spaced elevated overlying relation to the discharge end of said conveying means, said feeding device being connected with said slinging device for rotation in unison therewith and having a raised spiral rib portion operative to aid in delivering material to said slinging device from the discharge end of said conveying means, and means operatively connecting said conveying means, said slinging device and said feeding device with a power source.

6. In a fertilizer distributor including an elongated receptacle having a material supporting floor section, a material conveying means operatively coacting with said floor section to move material therealong toward one end of said receptacle, and a material slinging device having a support member operatively mounted adjacent said one end of said receptacle in opposed material receiving relation to the discharge end of said conveying means, the improvement comprising a conical feeding member mounted adjacent said one end of said receptacle with the apex of said conical member positioned in spaced elevated overlying relation to the discharge end of said conveying means, said conical member having its axis of rotation extending in the general direction material is moved by said conveying means and having a raised spiral rib portion on the periphery thereof for aiding in delivering material from said conveying means to said slinging device, said support member being attached to the base of said conical member for rotation therewith and forming a conical extension thereof, and means operatively connecting said conveying means, said slinging device, and said feeding members with a power source.

RECTOR C. FERGASON.

REFERENCES CITED

The following references are of record in the file of this patent:

UNITED STATES PATENTS

| Number | Name | Date |
|---|---|---|
| 2,256,655 | Stewart | Sept. 23, 1941 |
| 2,296,474 | Kucera | Sept. 22, 1942 |
| 2,311,726 | Blue | Feb. 23, 1943 |
| 2,343,303 | Kuhlman | Mar. 7, 1944 |

FOREIGN PATENTS

| Number | Country | Date |
|---|---|---|
| 597,224 | Great Britain | Jan. 21, 1948 |